No. 715,361. Patented Dec. 9, 1902.
H. H. DURR.
ELASTIC TIRE FOR VEHICLES.
(Application filed July 25, 1902.)
(No Model.)
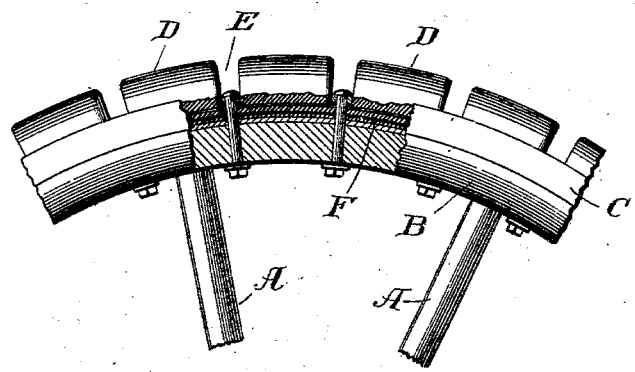
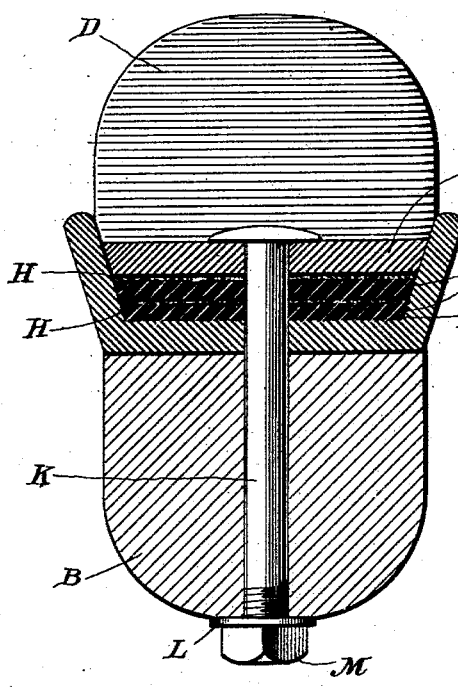
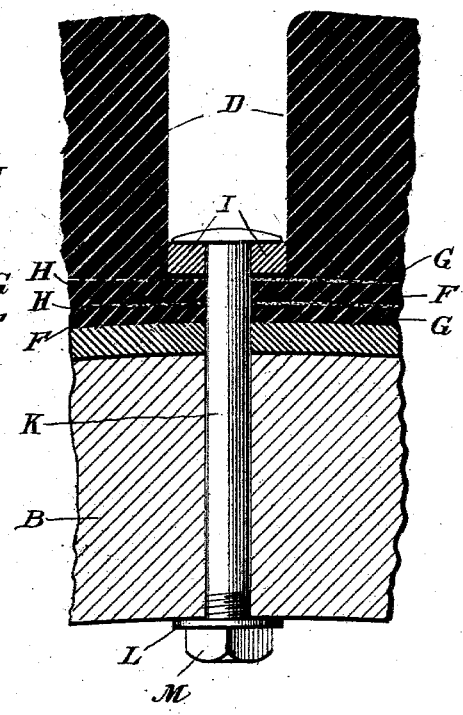
WITNESSES:
INVENTOR
Henry H Durr
BY
Phillips Abbott
ATTORNEY

UNITED STATES PATENT OFFICE.

HENRY H. DURR, OF NEW YORK, N. Y.

ELASTIC TIRE FOR VEHICLES.

SPECIFICATION forming part of Letters Patent No. 715,361, dated December 9, 1902.

Application filed July 25, 1902. Serial No. 116,945. (No model.)

*To all whom it may concern:*

Be it known that I, HENRY H. DURR, a citizen of the United States, and a resident of the borough of Manhattan, city, county, and State of New York, have invented a new and useful Improvement in Elastic Tires for Vehicles, of which the following is a full, clear, and exact specification, reference being had to the accompanying drawings.

Considerable difficulty has heretofore been experienced in attaching rubber tires, more particularly those of the so-called "sectional" form, to the rims or fellies of wheels, especially in large or heavy vehicles, such as automobile business-wagons, drays, and the like. Various methods have heretofore been employed for the construction of tires and for attaching them to the rims or fellies; but all of them, so far as I am aware, have been undesirable for one reason or another.

Under my present invention I provide means whereby the tires in question are relatively simple in construction, are exceedingly strong and durable, and may be attached to the rims or fellies of the wheels in a simple, inexpensive, neat, and durable manner.

Among the advantages secured by me are the following: The construction is light in weight, yet very strong. The appearance is neat and attractive. Any portion of the tire may be repaired without necessarily disorganizing more than the part immediately affected. There is no part of the tire which is liable to fracture under flexure, which is the case when hard rubber is employed in tire construction. The bolts which confine the elastic tire to the rim may also be employed to hold the rim to the underlying felly.

Referring to the drawings, Figure 1 illustrates an elevation of a portion of a wheel embodying my invention, a portion of the figure being in vertical section. Fig. 2 illustrates a transverse sectional view. Fig. 3 illustrates a detail, shown in longitudinal section.

A A represent the spokes of a wooden wheel. A metallic suspension-wheel may be employed.

B is the felly; C, the usual metallic rim, preferably made of steel in substantially the form shown.

D D are the sections of the rubber tire, separated by the usual opening E.

F is the web, with which the tire-sections D are integrally constructed. The web is composed of alternating layers of rubber G G and canvas, duck, or similar strengthening fibrous material H H. The web is shown best in Fig. 2 and is substantially the same width as the interior channel of the rim. Indeed, it should preferably, although not essentially, fit the interior groove of the rim snugly, so as to effect close union therewith, and the strengthening fibrous material—canvas, duck, or its equivalent—should preferably extend substantially from side to side of the web. I show in the drawings five layers of canvas and five of rubber cemented together and vulcanized. It will be readily understood that the number of layers of rubber and canvas may be such as preferred, depending upon the thickness and strength desired in the web.

In the manufacture of the tire the elastic sections D and the web embodying the rubber and fibrous material, as stated, are molded together and are vulcanized or otherwise united, so as to constitute an integral construction. The web may be continuous, as a single piece extending around the entire wheel, or it may be made in shorter pieces, thus facilitating repairs, as preferred. I I are what I term "clamp-bars." They extend transversely of the rubber tire in the openings E, between the sections D, and are made of such length as to extend from side to side of the channel of the rim, but with sufficient clearance at each end to permit of their being drawn down snugly and with force upon the web of the tire in the openings between the sections. Each clamping-bar is held in place and firmly clamped upon the web by a bolt or bolts K, which may beneficially be provided with a washer L and nut M on the inside of the felly, as shown best in Fig. 2. One bolt for each clamp-bar will ordinarily be sufficient; but if the wheels are large I sometimes prefer to employ two bolts suitably spaced upon the clamp-bar I, and if more than one is employed then the inner surface of the felly B should preferably be so fashioned as to afford a secure resting-place for the washers and nuts. The ends of the tire or of the several pieces composing the tire, if it be made of more than one piece, are so arranged as to meet midway beneath one or the other of the clamping-bars, and in order that they may have a firm hold upon the ends of the web I prefer to roughen the under side of the clamping-bars in some suitable manner, (not shown,) so that they will take a firm grip upon the projecting end or portion of the web when drawn snugly down by their bolts.

It will be noted that my tire is very simple in construction and also that the means of confining it to the rim are simple and effective.

My invention is intended to correct a most serious defect in such tires as heretofore constructed—that is to say, there are a number of constructions which work reasonably well on light vehicles which are not intended to carry any considerable load. They have been made in a variety of ways and secured to the rim in a variety of ways; but the problem is a markedly different one when each wheel has to carry from ten to twenty hundredweight or more. It has been found in practice that on vehicles of heavy construction intended to carry such a weight as above indicated the methods employed on lighter vehicles are entirely inadequate. In my construction, as above explained, the elastic sections and the base are molded and vulcanized into an integral structure, and the several layers of fibrous material serve as a non-frangible, non-tearable, and yet slightly-yielding medium whereby the elastic sections of the tire may be firmly and permanently held within the rim. My clamping-bars and bolts afford the most durable and simple means known for confining the ends of the web, and in the event of repairs being necessary they may be made speedily and inexpensively, and if the tire be made up of a number of short pieces the injured part only need be removed. Indeed, repairs may be readily made in a continuous tire by simply cutting out the defective part at any of the cross clamp-bars and inserting a perfect section in its place.

It will of course be understood that the clamping-bars and their bolts may be and preferably are placed between each of the tire-sections in the opening E, as well as at the ends of the sections or where two ends of the web abut against each other.

It will be obvious to those who are familiar with this art that modifications may be made in the details of construction without departing from the essence of the invention. I therefore do not limit myself to such details.

Having described my invention, I claim—

1. The combination of a hollow metallic rim, a tire having elastic sections and a flexible and non-frangible base composed of alternating layers of fibrous material and rubber, the whole being molded and vulcanized into an integral structure, transverse clamping-bars located on the web of the tire between its sections and which extend substantially from side to side of the tire and a bolt or bolts for securing the clamping-bars, for the purpose set forth.

2. The combination of a hollow metallic rim having lateral flanges, a tire having elastic sections and a flexible and non-frangible base composed of alternating layers of fibrous material and rubber, the whole being molded and vulcanized into an integral structure and adapted to rest within the metallic rim between its flanges, transverse clamping-bars which extend substantially from flange to flange of the metallic rim and which impinge upon substantially the full width of the web of the tire between its sections, and a bolt or bolts for confining the clamping-bars, for the purpose set forth.

3. The combination of a hollow metallic rim, a tire having elastic sections and a flexible and non-frangible base composed of alternating layers of fibrous material, which are substantially as wide as the base-web itself, and rubber, the whole being molded and vulcanized into an integral structure, transverse clamping-bars located on the web of the tire between the sections and which extend substantially from side to side of the rim and a bolt or bolts engaging with the clamping-bars and passing through the rim, for the purpose set forth.

In testimony whereof I have signed my name to this specification in the presence of two subscribing witnesses.

HENRY H. DURR.

Witnesses:
PHILLIPS ABBOTT,
F. M. DONSBACH.